United States Patent
Hunt (10) Patent No.: US 7,204,500 B2
(45) Date of Patent: Apr. 17, 2007

(54) MOTION CONTROL ARM BRACKET ASSEMBLY

(75) Inventor: Thomas Steven Hunt, Sophia, NC (US)

(73) Assignee: Volvo Trucks North America Inc., Greensboro, NC (US)

( * ) Notice: Subject to any disclaimer, the term of this patent is extended or adjusted under 35 U.S.C. 154(b) by 445 days.

(21) Appl. No.: 10/830,598

(22) Filed: Apr. 23, 2004

(65) Prior Publication Data

US 2005/0236798 A1   Oct. 27, 2005

(51) Int. Cl.
*B60G 11/00* (2006.01)

(52) U.S. Cl. .................. 280/124.175; 267/260

(58) Field of Classification Search ......... 280/124.175, 280/124.128, 124.153, 124.163; 267/260, 267/270, 264, 268
See application file for complete search history.

(56) References Cited

U.S. PATENT DOCUMENTS

| | | | |
|---|---|---|---|
| 1,070,548 A | * | 8/1913 | Smith ................. 384/396 |
| 1,545,299 A | | 7/1925 | Abrey |
| 2,299,392 A | | 10/1942 | Johnson et al. |
| 2,316,439 A | | 4/1943 | Leighton |
| 3,434,707 A | * | 3/1969 | Raidel ................. 267/31 |
| 3,596,923 A | * | 8/1971 | Nakamura et al. .... 280/124.175 |
| 6,209,897 B1 | * | 4/2001 | Bundy et al. ......... 280/124.175 |

FOREIGN PATENT DOCUMENTS

| | | |
|---|---|---|
| EP | 0615869 | 9/1994 |
| JP | 2002264623 | 9/2002 |

\* cited by examiner

*Primary Examiner*—Paul N. Dickson
*Assistant Examiner*—Drew J. Brown
(74) *Attorney, Agent, or Firm*—Martin Farrell (57) ABSTRACT

A bracket assembly for mounting a control arm, such as a leaf spring, of a vehicle suspension. The bracket assembly includes a first, relatively more rigid member including a first mounting flange and a second, relatively more flexible member including a second mounting flange. The second member is fixed to the first member such that the first mounting flange and the second mounting flange form a fork that accepts a control arm end.

34 Claims, 9 Drawing Sheets

MOTION CONTROL ARM BRACKET ASSEMBLY

FIELD OF THE INVENTION

The present invention relates to vehicle suspensions. In particular, the present invention relates to a motion control arm bracket assembly.

BACKGROUND OF THE INVENTION

Suspensions, such as vehicle suspensions, typically include a motion control arm, such as a spring leaf, interposed between a mass suspending structure, such as a vehicle axle, and a frame member, such as a vehicle chassis. Various brackets have been proposed for connecting motion control arms to different types of frame members.

One type of bracket is a one piece cast bracket with two legs or flanges. The purpose of the legs is to transmit operating loads from a suspension to a frame member. A disadvantage of a cast type bracket with two cast legs is that it is relatively expensive due to a secondary machining operation that is required to provide the necessary spacing between the cast legs. This relatively precise spacing is required in order to install a suspension's motion control arm end.

Another type of bracket is a one-piece fabricated bracket with two legs or flanges formed from sheetmetal. A disadvantage of this type of bracket is that the fabricated bracket's legs are not as efficient at transmitting lateral operating loads as cast brackets of similar design, since the fabricated type of bracket is less stiff.

SUMMARY OF THE INVENTION

The present invention concerns a bracket assembly for mounting a suspension motion control arm, such as a leaf spring. The bracket assembly includes two structural members. The first structural member is substantially rigid and includes a first mounting flange. The second structural member is more flexible than the first structural member and includes a second mounting flange. A fork is formed by the attachment of the second structural member to the first structural member. The fork is designed to accept the end of a suspension motion control arm.

In one embodiment, one or more fasteners that fix the second member to the first member are tightened after the motion control arm is placed in the fork. For example, the first and second structural members are fastened together after the end of the motion control arm is positioned between the flanges that define the fork in one embodiment. In this embodiment, the end of the motion control arm may be connected to the fork by aligning the end of the motion control arm with corresponding holes in the fork. A fastener is inserted into the aligned holes of the fork defining flanges and motion control arm end and then tightened. After the motion control arm is secured in the fork, fasteners that attach the two structural members are tightened.

In one embodiment, the second member is deflected and the first member is substantially undeflected during mounting of the motion control arm end in the fork. In this embodiment, the second mounting flange may be formed to extend or angle slightly away from the first mounting flange when the second member is in an undeformed state. The second mounting flange becomes substantially parallel to the first mounting flange when a leaf spring is mounted in the fork. In this embodiment, the first and second structural members may be permanently fastened prior to the assembly of the motion control arm end within the fork. A clamping force is applied to the second mounting flange, forcing the second mounting flange to contact the side of the motion control arm end.

In one embodiment, the second member is configured such that stress applied by deflecting the second member during clamping of the motion control arm end in the fork is prevented from being concentrated in an area of the second member where service loads are applied. For example, the stress applied by deflecting the second member during mounting of the motion control arm end in the fork can be prevented from being concentrated in the second mounting flange. That is, an area of the second member other than the second mounting flange bends as the clamping force is applied.

In one embodiment, a first fastener that fixes the second member to the first member is tightened before the motion control arm is accepted by the fork and a second fastener that fixes the second member to the first member is tightened after the motion control arm is accepted by the fork. For example, the fastener(s) that are farthest from the intended installation point of the motion control arm are completely and permanently fastened. The remaining fasteners that are nearer to the installation point of the motion control arm end are not tightened until after the motion control arm is secured in the fork. In this embodiment, the second flange may angle away from the first flange to enable installation of the motion control arm end between the two flanges of the fork. After the motion control arm end is positioned in the fork, a fastener is installed through holes in the fork flanges and the motion control arm end. Tightening the fastener deforms the second member to the extent that the second mounting flange contacts the side of the motion control arm end. After the motion control rod end is securely installed in the fork, the remaining fasteners are tightened.

The second member may be constructed to be more flexible than the first member in a variety of ways. The first member may be made from a first material and the second member may be made from a second material that is more flexible than the first material. For example, the first member can be made from cast iron, cast aluminum, or the like and the second member can be made from steel, titanium, etc. In another embodiment, the first member and the second member could be made from the same material, but portions of the second member are thinner than the first member.

The two part hybrid bracket assembly of the present invention has a number of advantages over prior art motion control arm brackets. Whether cast or fabricated, one disadvantage of prior art one piece brackets is that they are restricted to being made form only one type of material. The first and second members of the two part hybrid bracket assembly can be made from different materials that are tailored according to unique design requirements of stiffness, weight, and cost.

Additional features of the invention will become apparent and a fuller understanding will be obtained by reading the following detailed description in connection with the accompanying drawings.

DETAILED DESCRIPTION

Figure 1:
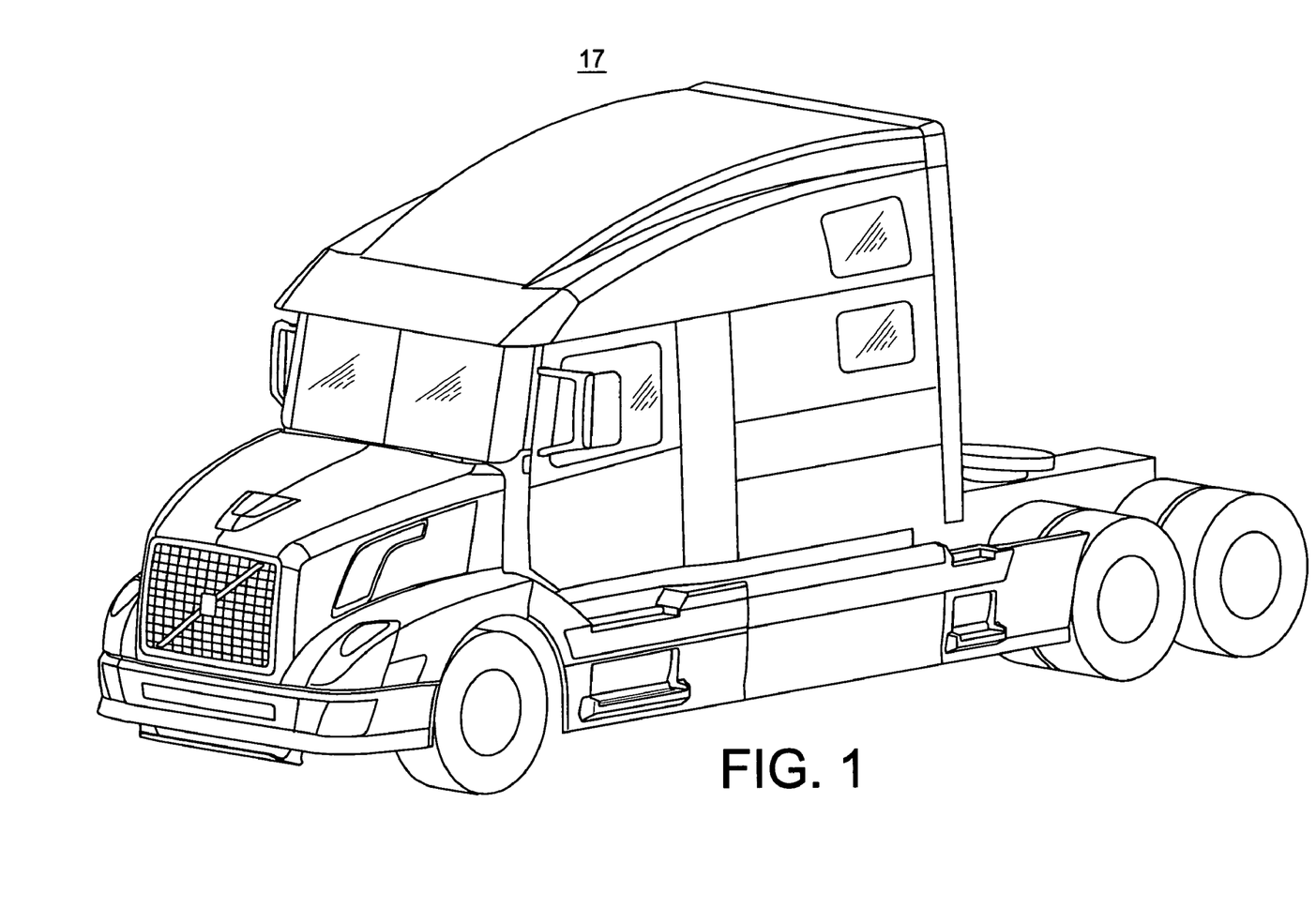
FIG. 1 is a perspective view of a tractor.
Figure 2:
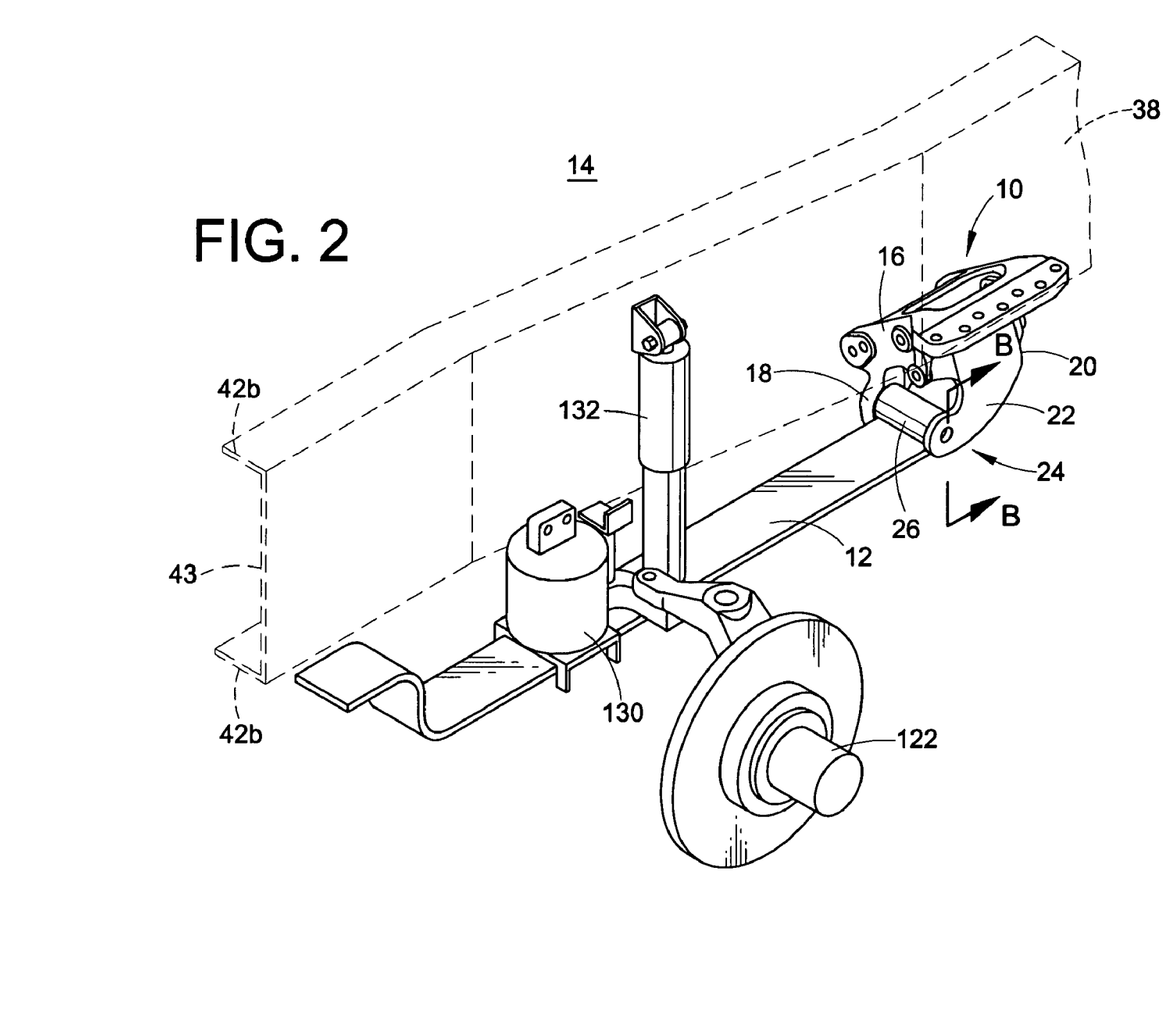
FIG. 2 is an illustration of a suspension that includes a control arm bracket mounting assembly.

The present disclosure concerns a bracket assembly for mounting a motion control arm. The bracket assembly can be used for mounting a motion control arm in a vehicle, such as the tractor 17 illustrated by FIG. 1. An example of a motion control arm is illustrated in FIG. 2 as a leaf spring 12 of a vehicle suspension 14. One side of a front suspension 14 of a tractor that utilizes the inventive bracket assembly 10 is illustrated by FIG. 2. It should be apparent that the bracket assembly 10 could be utilized in any suspension that requires mounting of a control arm 12. The frame 38 is illustrated in phantom lines to simplify the drawing. The illustrated frame 38 is an elongated "C" shaped member having first and second flanges 42a, 42b that extend from a wall 43. The illustrated suspension 14 controls movement of an axle 122 with respect to the frame 38. The control arm 12 supports the axle 122. The control arm end 26 is connected to the frame 38 by the bracket assembly 10 to connect the control arm to the frame. The bracket assembly 10 is connected to the frame flange 42b. The illustrated suspension also includes a pair of air springs 130 and a pair of dampers 132 interposed between the axle and the frame. The air spring 130 and the damper 132 are connected to the frame wall 43. The bracket assembly 10 includes a first member 16 with a mounting flange 18 and a second member 20 including a mounting flange 22. The second member 20 is fixed to the first member 16 such that the flange 18 and the flange 22 form a fork 24 that accepts a motion control arm end 26, such as a leaf spring end. In one embodiment, the mounting flange 18 of the first member is substantially rigid and the mounting flange 22 is relatively flexible as compared to the flange 18. The flange 22 is deflected and the rigid flange 18 is substantially undeflected during mounting of the leaf spring end 26 in the fork 24.

Referring to FIGS. 3–8, the illustrated first member 16 is a cast member, such as a cast iron member. The flange 18 includes two substantially flat surfaces 19a, 19b. The inner flat surface 19a allows for flush abutment with the motion control arm end 26. The outer flat surface 19b allows for flush abutment with a fastener surface. An opening 28 (FIG. 8) extends through the flange 18. The opening 28 accepts a screw 30 (FIG. 4) for mounting the motion control arm end 26. A difference in flexibility between the first member 16 and the second member 20 can be accomplished in a variety of ways. For example, the first flange 18 can be thicker than the second flange 22, the material that the flange is made from can be less flexible than the material that the flange 22 is made from, and/or portions of the second member can be designed to accommodate flexing of the flange 22.

In the configuration illustrated by the drawings, a material web 34 extends from the rigid flange 18 to a mounting flange 36 for mounting the bracket assembly to a vehicle frame. The material web 34 and mounting flange 36 are configured to be substantially rigid once the mounting flange 36 is mounted to the vehicle frame.

The illustrated mounting flange 36 includes two substantially flat surfaces 40a, 40b. The upper flat surface 40a allows for flush abutment with a frame member surface. The lower flat surface 40b allows for flush abutment with a fastener surface. In the illustrated embodiment, the mounting flange surfaces 40a, 40b are perpendicular to the flange surfaces 19a, 19b. The illustrated mounting flange 36 includes a plurality of openings 44 that accept fasteners for mounting the bracket assembly to the frame member.

Figure 6:
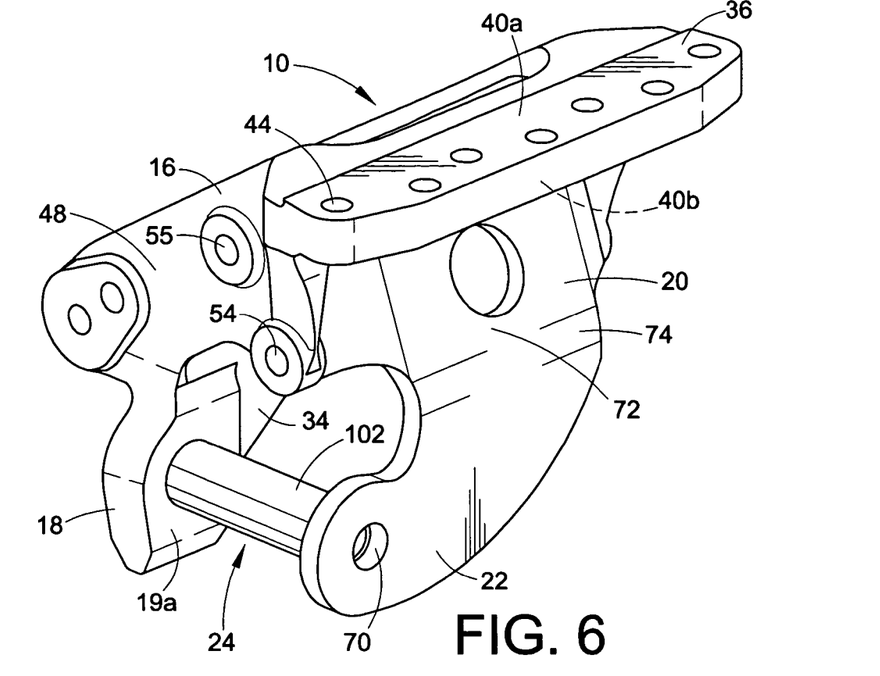
FIG. 6 is a perspective view of a control arm mounting bracket assembly.
Figure 7:
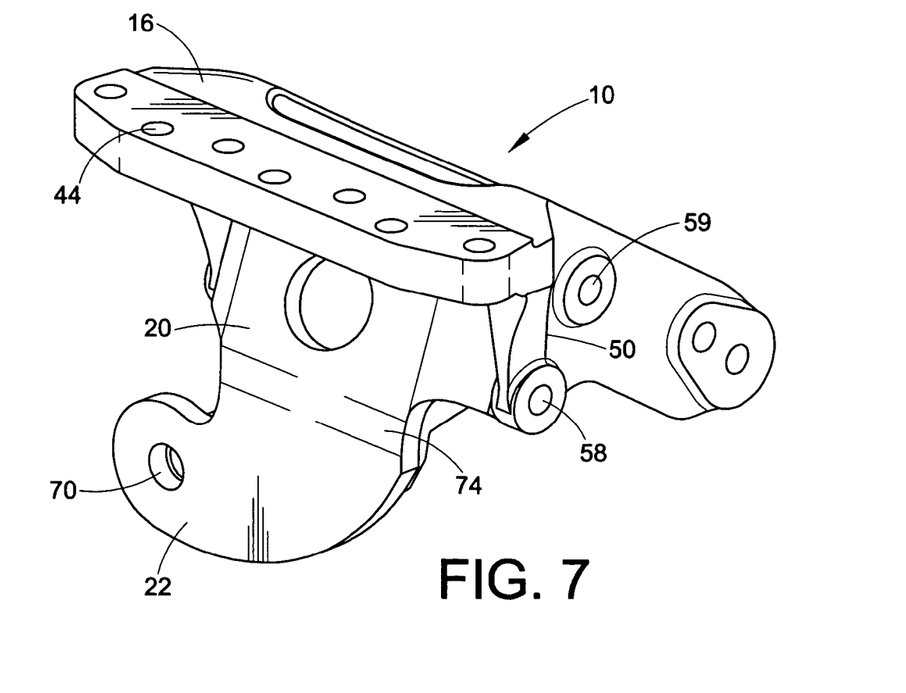
FIG. 7 is a perspective view of a control arm mounting bracket assembly.

Referring to FIGS. 6 and 7, the illustrated first member 16 includes first and second walls 48, 50 that facilitate attachment of the second member 20 to the first member. Referring to FIG. 6, the first wall 48 adds to the rigidity of the rigid flange 18. The first wall 48 includes openings 54, 55 that facilitate attachment of the second member 20 to the first member 16. Referring to FIG. 7, the second wall 50 includes openings 58, 59 that facilitate attachment of the second member 20 to the first member 16.

FIGS. 3–8 illustrate a second member 20 of a first embodiment. The second member 20 illustrated in FIGS. 3–8 is a formed member, such as a member formed by bending pressed steel. The flange 22 includes an opening 70 that accepts the screw 30 for mounting the control arm end 26. In the embodiment illustrated by FIGS. 3–8, the flange 22 is thinner and more flexible than the flange 18.

The second member 20 includes mounting structures that facilitate attachment of the second member 20 to the first member 18. In the embodiment illustrated by FIG. 8, the mounting structures are first and second flanges 78, 80. The first flange 78 includes openings 84, 85 that facilitate attachment of the second member 20 to the first member 16. The second flange 80 includes openings 90, 91 that facilitate attachment of the second member 20 to the first member 16.

Figure 8:
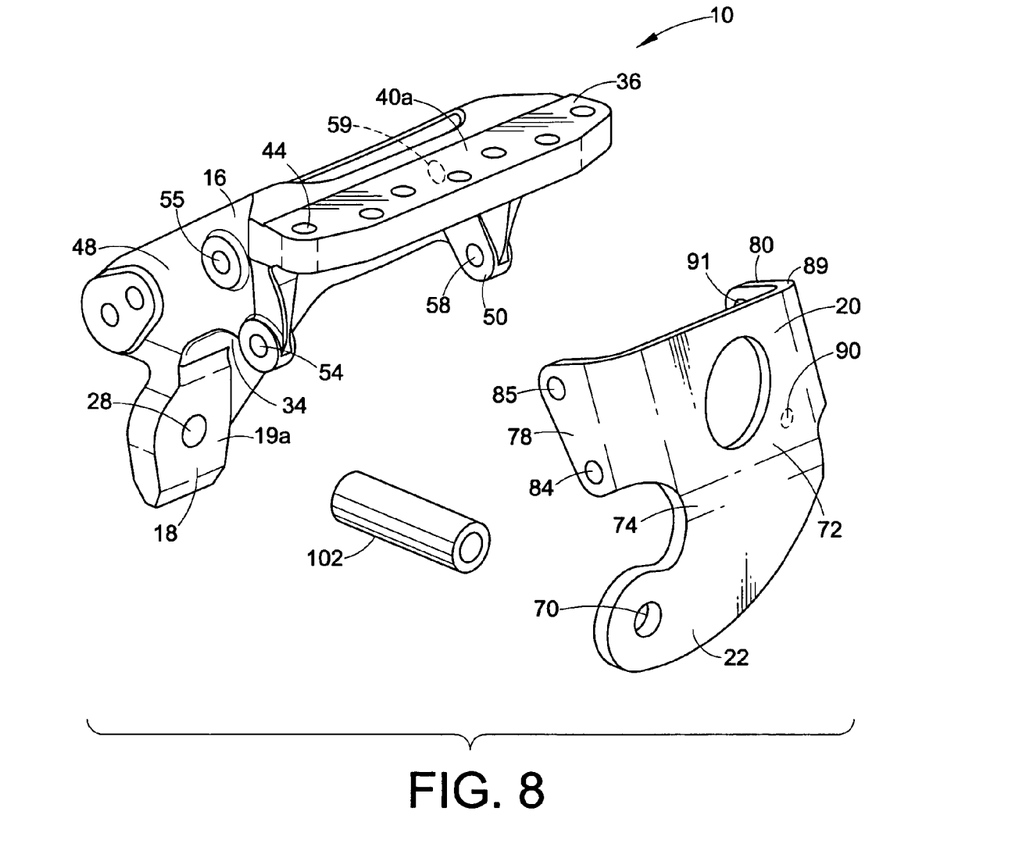
FIG. 8 is an exploded perspective view of a control arm mounting bracket assembly.

The bracket assembly 10 is assembled by aligning the openings 54, 55, 58, 59 of the first member with the openings 84, 85, 90, 91 of the second member. The first flange 78 is secured to the first wall 48 with fasteners that extend through the openings 54, 84 and openings 55, 85. The second flange 80 is secured to the second wall 50 with fasteners that extend through the openings 58, 90 and openings 59, 91. As will be explained in more detail below, the fasteners can be permanent fasteners that effect permanent attachment of the second member to the first member, such as rivets, the fasteners may be removable fasteners, such as threaded fasteners, that allow the second member to be more easily removed from the first member, or a combination of permanent and removable fasteners may be used.

Figure 9:
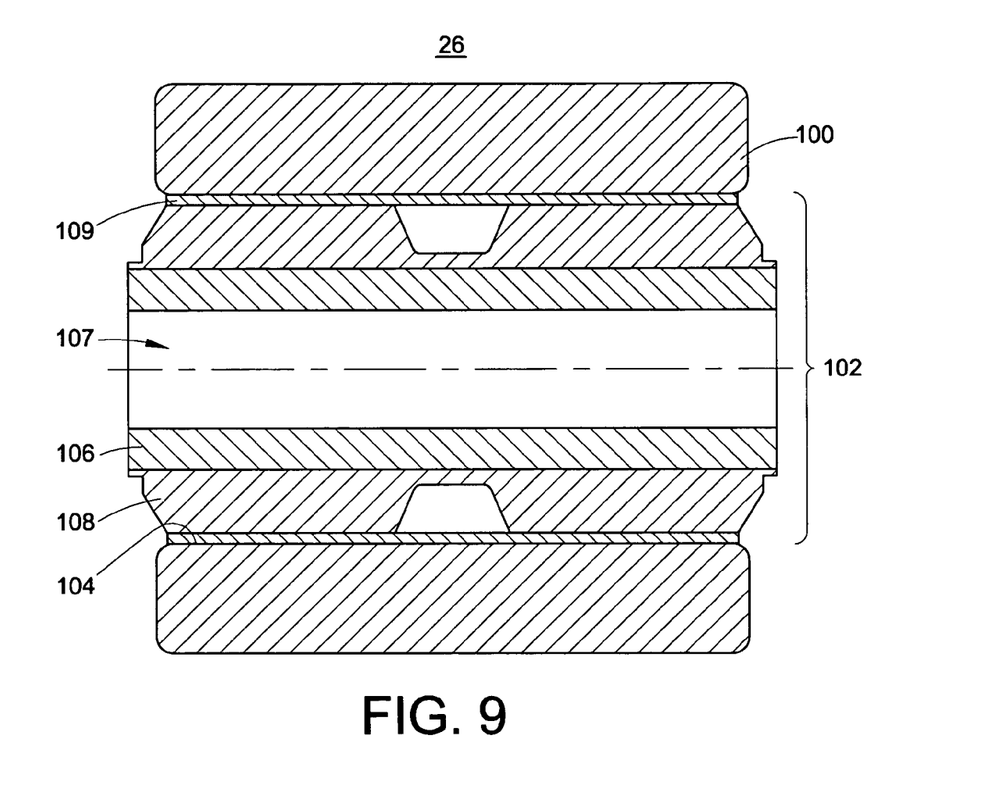
FIG. 9 is a sectional view taken along lines B—B in FIG. 2.

FIG. 9 is a sectional view of a control arm end 26 taken along lines B—B in FIG. 2. The illustrated motion control arm end is a leaf spring end. The example of a leaf spring end 26 depicted by FIG. 9 includes a spring eye 100 and a bushing 102. The spring eye 100 is cylindrical with an inner surface 104 that accepts the bushing 102. The illustrated bushing includes an inner metal sleeve 106, a rubber element 108 disposed around the metal sleeve 106, and an outer sleeve 109. The inner metal sleeve includes an attachment opening 107 through which a screw or the like is passed for attachment of the motion control arm end to a bracket assembly. The rubber element fits in the outer sleeve. The outer sleeve 109 fits within the inner surface 104 of the spring eye. The example of a leaf spring end illustrated by FIG. 9 is only one of a wide variety of different types of leaf spring ends that could be used.

Figure 4:
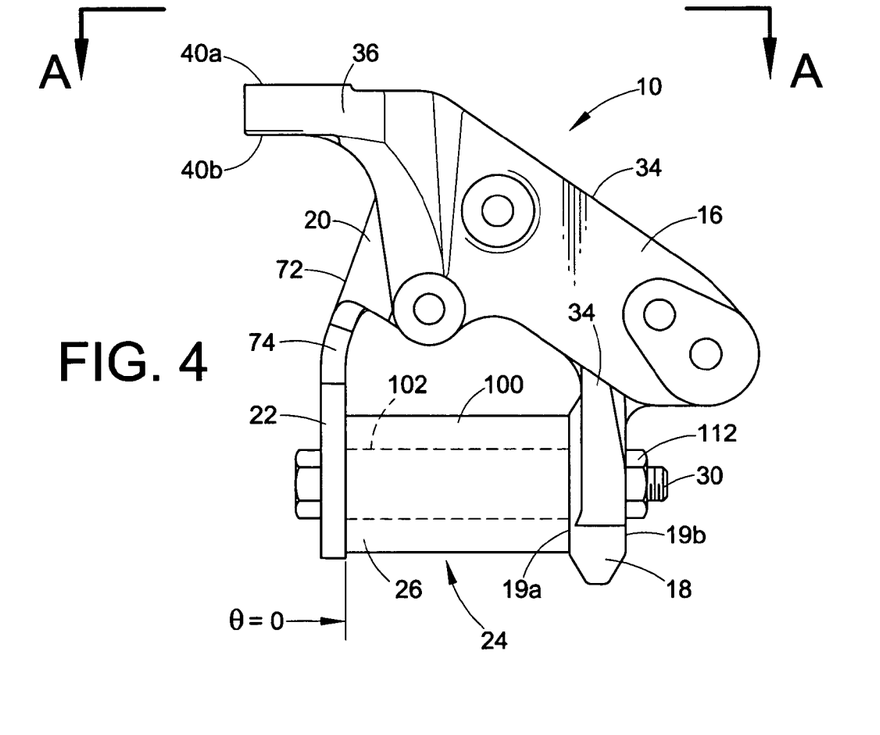
FIG. 4 is an elevational view of a control arm mounting bracket assembly.
Figure 5:
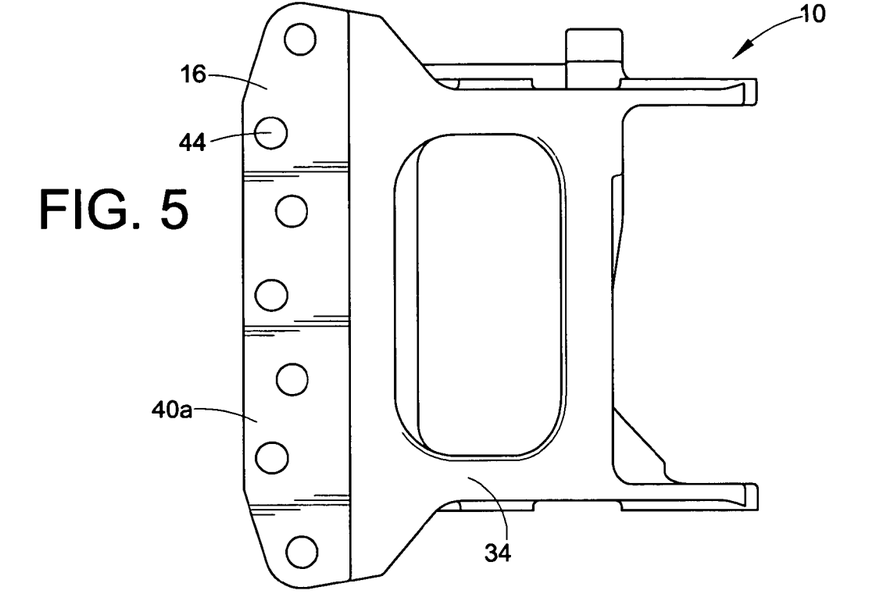
FIG. 5 is a view taken along lines A—A in FIG. 4.

Referring to FIGS. 2 and 4, during installation of a suspension 14, each control arm end 26 is aligned with the fork of its respective bracket assembly. A screw 30 is passed through the flange 18, the control arm end 26, and the flange 22. A mating nut 112 is attached to the screw 30 and is tightened to a predetermined torque.

Figure 10:
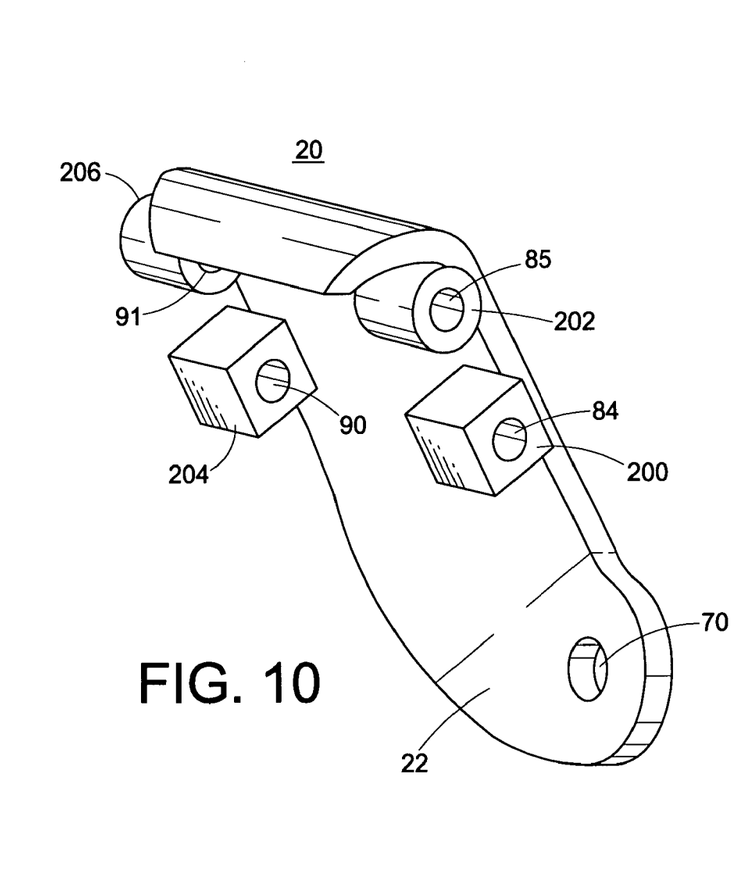
FIG. 10 is a perspective view of a member of a motion control arm bracket assembly.

Referring to FIG. 8, a motion control arm, such as the illustrated leaf spring, can be secured to the fork at various points of assembly of the second member 20 to the first member 16. In one embodiment, removable fasteners, such as bolts, that secure the first and second members 16, 18 together are tightened only after the motion control arm end is positioned between the flanges 18, 22. In this removable fastener embodiment, when the fasteners that secure the first and second members together are tightened there is not a substantial gap between the motion control arm end and either of the flanges 18, 22. After the motion control arm is aligned in the fork, a fastener is inserted into the aligned holes of the flanges and the leaf spring end and tightened. The gap illustrated by angle θ shown in FIG. 3 would not be present in this removable fastener embodiment. That is, the flange 22 is not deformed to secure the control arm end 26 in the fork. After the control arm end is secured in the fork, the fasteners that attach the bracket members 16, 20 are tightened. The second member 16 can easily be replaced to change the mechanical properties of the bracket assembly 10. One second member 20 that is adapted for this embodiment is illustrated by FIG. 10. The mounting structures of the second member 20 illustrated by FIG. 10 comprise spacers 200, 202, 204, 206 that are attached to the member 20 by, for example, welding. Mounting holes 84, 85, 90, 91 are defined in the spacers. The mounting holes are sized to provide a small amount of clearance, for example 1–1½ mm, around bolts (not shown) that are used to secure the second member 20 to the first member. This clearance allows the control arm end to be installed into the fork without requiring flange 22 to angle away from the second member.

Figure 3:
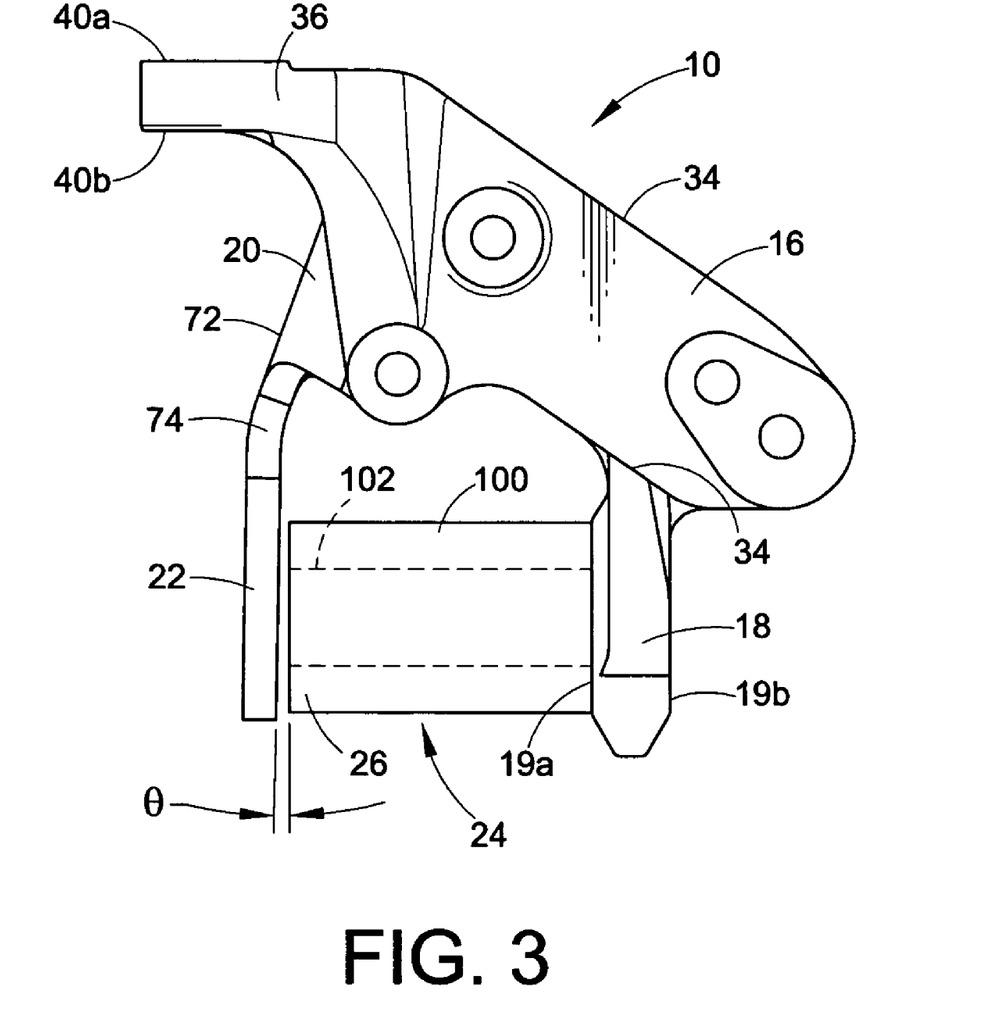
FIG. 3 is an elevational view of a control arm mounting bracket assembly.
Figure 11:
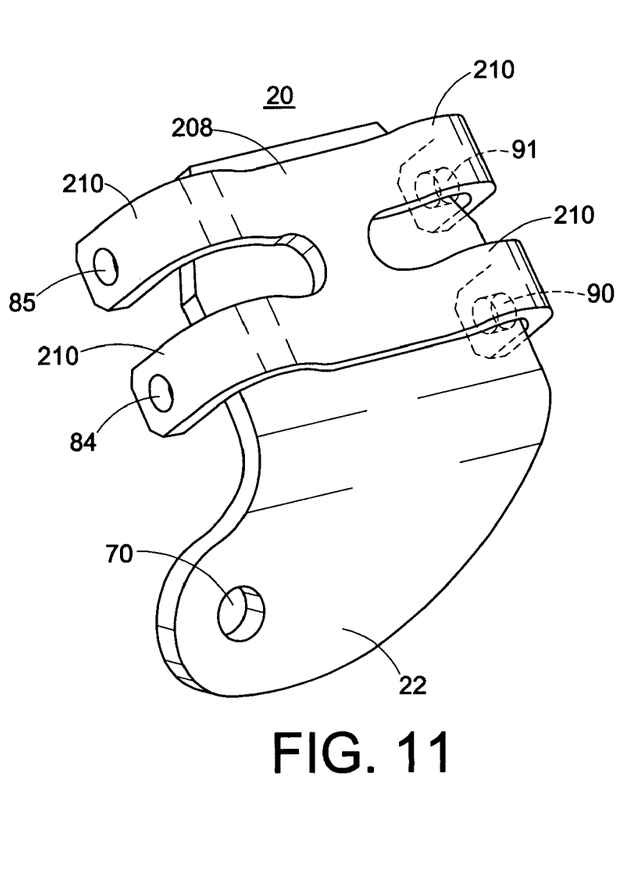
FIG. 11 is a perspective view of a member of a motion control arm bracket assembly.
Figure 12:
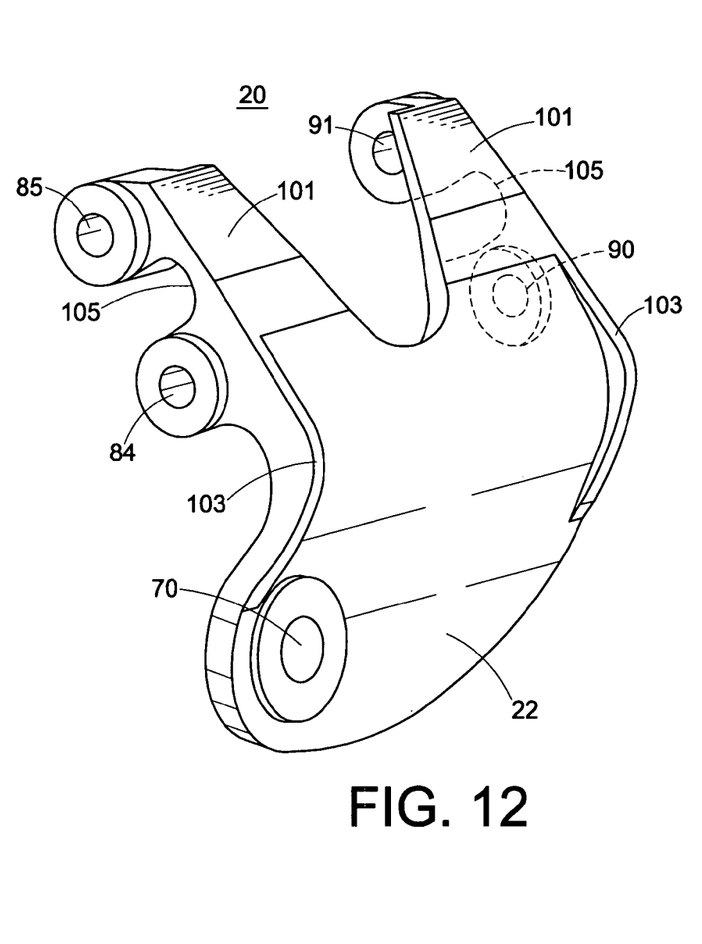
FIG. 12 is a perspective view of a member of a motion control arm bracket assembly.

In another embodiment, the first and second structural members are permanently fastened prior to the assembly of the control arm end within the fork of the bracket assembly. Referring to FIG. 3, the flexible flange 22 of the bracket assembly 10 extends slightly away from the rigid flange 18 or "kicks out" when the flexible flange is in an undeformed state (i.e. before the control arm end is secured in the fork) in this embodiment. This "kick out" facilitates installation or removal of a control arm end, such as a leaf spring, to or from the vehicle frame by providing clearance around the control arm end when the flexible flange is undeformed. This clearance is illustrated by angle θ that is greater than zero degrees in FIG. 3. Referring to FIG. 4, the flexible flange 22 becomes substantially parallel to the rigid flange 18 when a control arm is mounted in the fork by tightening the screw 30. Angle θ becomes zero when the control arm is mounted in the fork. This permanently fastened embodiment may be employed when the severity of the suspension operating conditions require the use of a more robust, permanent joint (such as rivets) for joining the members 16, 20. As torque is applied to the screw 30, the flange 22 deflects to clamp the control arm end between the flange 18 and the flange 22. In the exemplary embodiment, the deflection of the second member 20 is elastic. One other member 20 that is adapted for this embodiment is illustrated by FIG. 11. The mounting structures of the member 20 illustrated by FIG. 11 are defined by a stress relieving member 208 that is suitably welded to the flange 22. Mounting holes 84, 85, 90, 91 are defined in legs 210 that flex as the flange 22 is deflected from the position shown in FIG. 3 to the position shown in FIG. 4, to reduce the amount of stress on the flange 22. FIG. 12 provides another example of a member 20 that is suited for this embodiment. Service loads that are applied to the second member 20 by the suspension during vehicle operation are more concentrated in some areas of the member 20. For example, the service loads may be concentrated in the flange 22. Stress is applied to the member 20 as the fastener is tightened to move the flange 22 from the position shown in FIG. 3 to the position shown in FIG. 4. The member illustrated by FIG. 12 is configured to prevent this stress from being applied to areas of member 20 where service loads are applied. In the example of FIG. 12, the flange 22 is sufficiently rigid to transfer the energy of tightening fastener to a region 101 that is subject to less service loading. The flange 22 in the example of FIG. 12 is relatively thick and includes stiffening ribs 103. Cutouts 105 are defined near the region 101. These cutouts 105 allow the member 20 to flex at region 101 as the fastener is tightened. Moving the stress applied by the fastener to region 101 diminishes the combined stress in other regions of the member 20, which carry a more significant portion of the service induced loading.

Figure 13:
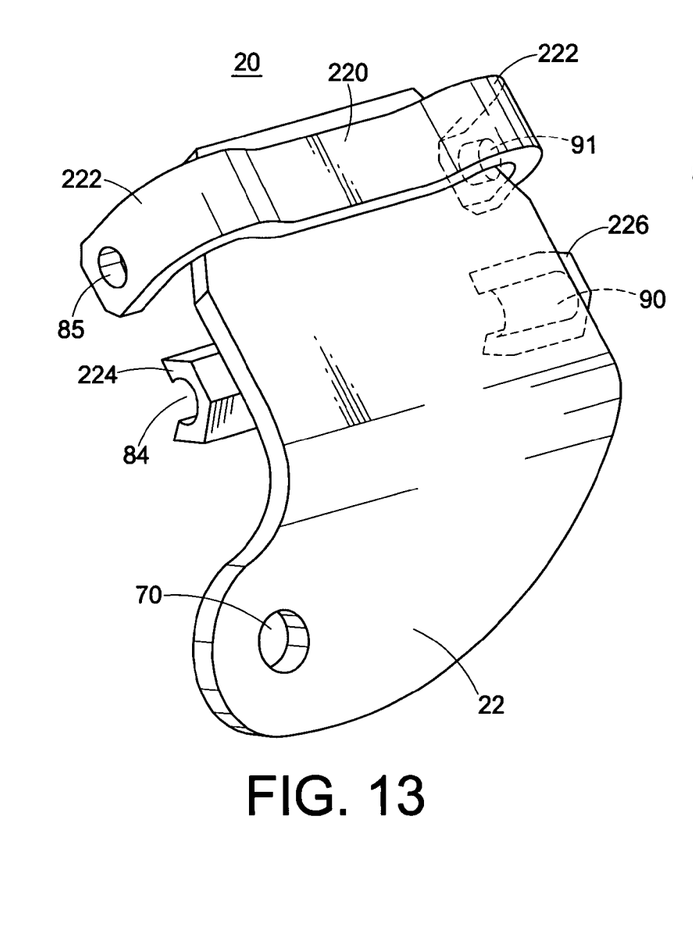
FIG. 13 is a perspective view of a member of a motion control arm bracket assembly.

With reference to FIG. 8, in yet another embodiment, the first and second structural members 16, 20 are partially fastened together before the control arm end is assembled within the fork. Fastening of the members is completed after the control arm end is assembled in the fork. In this embodiment, permanent fasteners, such as rivets, are installed through openings 55, 85 and openings 59, 91, which are farthest from the installation point of the control arm end. At the same time fasteners that extend through openings 54, 84 and openings 58, 90 are inserted, but not tightened. Referring to FIGS. 3 and 4, the flexible flange 22 angles away from the rigid flange 18 to enable installation of the control arm end 26 in this embodiment. After the control arm end 26 is aligned with the holes in each flange, a fastener 30 is installed and tightened. Tightening the fastener 30 deforms the second member 20 until the flexible flange contacts the side of the control arm end 26. Once tightened, the flexible flange is substantially parallel to the rigid flange as illustrated by FIG. 4. Since the fasteners nearest the control rod end attachment point were merely inserted, but not tightened, installation stresses in the flange 22 are transferred to less critical areas of the member 20. This is due to decreased constraints on flange 22 during the installation of the control arm end 26. Referring to FIG. 3, after the control arm end 26 is securely installed within the fork of the flanges 18, 22, the fasteners that extend through openings 54, 84 and openings 58, 90, nearest the control rod end attachment points, are tightened. One second member 20 that is especially adapted for this embodiment is illustrated by FIG. 13. The mounting structures of the member illustrated by FIG. 13 are defined by a stress relieving member 220 and spacers 224, 226 that are suitably welded to the flange 22. Holes 85, 91 defined in the stress relieving member 220 accept permanent fasteners such as rivets in this embodiment. The stress relieving member 220 includes legs 222 that flex as the flange 22 is deflected from the position shown in FIG. 3 to the position shown in FIG. 4. The holes 84, 90 defined by spacers 224, 226 provide clearance around fasteners, such as bolts.

The disclosed bracket assembly design enhances the ride and handling of a vehicle by providing a structurally stiff link between the vehicle's suspension and its suspended mass. The bracket assembly provides a lightweight, inexpensive, structurally sound solution for securing a vehicle suspension to a vehicle frame. The bracket assembly eliminates the need for a secondary machining operation required by one piece cast brackets. The bracket assembly has the advantage of having the lateral stiffness which had only been available through the conventional, one-piece, cast bracket design.

While the present invention has been described with a degree of particularity, it is the intent that the invention include all modifications and alterations falling within the spirit or scope of the appended claims.

The invention claimed is:

1. A bracket assembly for mounting a motion control arm of a vehicle suspension, comprising:
   a) a first member including a first mounting flange and having connecting walls;
   b) a second member including a second mounting flange and having connecting flanges, the connecting flanges of the second member being fixed to the connecting walls of the first member by a plurality of fasteners such that the first mounting flange and the second mounting flange form a fork that accepts a motion control arm end, the fork having a first position for mounting the motion control arm end and a second position for securing the motion control end.

2. The bracket assembly of claim 1 wherein the second mounting flange is more flexible than the first mounting flange and wherein the second member is deflectable and the first member is substantially undeflectable for mounting of the motion control arm end in the fork.

3. The bracket assembly of claim 2 wherein the second member is configured such that stress applied by deflecting the second member during mounting of the motion control arm end in the fork is prevented from being concentrated in an area of the second member where service loads are applied.

4. The bracket assembly of claim 3 wherein the stress applied by deflecting the second member during mounting of the motion control arm end in the fork is prevented from being concentrated in the second mounting flange.

5. The bracket assembly of claim 1 wherein the first and second positions of the fork are set by a first fastener that fixes the second member to the first member being tightened before the motion control arm is accepted by the fork and a second fastener that fixes the second member to the first member is being tightened after the motion control arm is accepted by the fork.

6. The bracket assembly of claim 5 wherein the second mounting flange is more flexible than the first mounting flange and wherein the first fastener is farther away from the flexible flange than the second fastener.

7. The bracket assembly of claim 5 wherein the first fastener permanently fastens the second member to the first member.

8. The bracket assembly of claim 1 wherein the motion control arm is a leaf spring.

9. The bracket assembly of claim 1 wherein the first member is made from a first material and the second member is made from a second material and said second material is more flexible than said first material.

10. The bracket assembly of claim 1 wherein the first member is made from one of cast iron and cast aluminum and the second member is made from one of steel and titanium.

11. The bracket assembly of claim 1 wherein the first mounting flange is thicker than the second mounting flange.

12. The bracket assembly of claim 1 wherein the second mounting flange extends away from the first mounting flange when the second mounting flange is in an undeformed state and the second mounting flange is substantially parallel to the first mounting flange when a leaf spring is mounted in the fork.

13. The bracket assembly of claim 1 wherein said second member can be removed from said first member by removing one or more fasteners.

14. A bracket assembly for mounting a motion control arm of a vehicle suspension, comprising:
   a) a first member including a first mounting flange;
   b) a second member including a second mounting flange, the second member is fixed to the first member such that the first mounting flange and the second mounting flange form a fork that accepts a motion control arm end,
   wherein a first fastener that fixes the second member to the first member is tightened before the motion control arm is accepted by the fork and a second fastener that fixes the second member to the first member is tightened after the motion control arm is accepted by the fork and,
   wherein the second mounting flange is deflected and the first mounting flange is substantially undeflected during mounting of the motion control arm end in the fork.

15. A vehicle suspension, comprising:
   a) a bracket assembly coupled to the vehicle including a first member with a first mounting flange and a second member including a second mounting flange, the second member is fixed to the first member by first fasteners and second fasteners such that the first mounting flange and the second mounting flange form a fork, the second mounting flange having a mounting position for mounting a control arm and securing position for securing the control arm; and
   b) a motion control arm including a mounting structure secured in the fork, wherein the second fasteners are relatively loose for the mounting position and tightened for the securing position.

16. The bracket assembly of claim 15 wherein the second mounting flange is more flexible than the first mounting flange.

17. The vehicle suspension of claim 16 wherein the first fastener is farther away from the flexible flange than the second fastener.

18. The vehicle suspension of claim 15 wherein the first fastener permanently fastens the second member to the first member.

19. The suspension of claim 15 wherein the first member is made from a first material and the second member is made from a second material and said second material is more flexible than said first material.

20. The suspension of claim 15 wherein the first mounting flange is thicker than the second mounting flange.

21. The suspension of claim 15 wherein the second mounting flange extends away from the first mounting flange before the motion control arm mounting structure is secured in the fork and the second mounting flange is substantially parallel to the first mounting flange when the mounting structure is secured in the fork.

22. The suspension of claim 15 wherein said second member can be removed from said first member by removing one or more fasteners.

23. The suspension of claim 15 wherein the mounting structure is secured in the fork by a fastener that extends through the rigid flange, the mounting structure, and the flexible flange and wherein tightening of the fastener deflects the flexible flange toward the rigid flange until the flexible flange and the rigid flange engage the mounting structure.

24. The suspension of claim 15 wherein the second member is configured such that stress applied by deflecting the second member during mounting of the control arm in the fork is prevented from being concentrated in an area of the second member where service loads are applied.

25. The suspension of claim 24 wherein the stress applied by deflecting the second member during mounting of the control arm in the fork is prevented from being concentrated in the second mounting flange.

26. A method of mounting a motion control arm of a vehicle suspension, comprising:
  a) connecting a first member with a first mounting flange to a second member including a second mounting flange such that the first mounting flange and the second mounting flange form a fork and the second mounting flange diverges relative to the first mounting flange;
  b) attaching the fork to the vehicle;
  c) inserting a motion control arm mounting structure into the fork; and
  d) applying a clamping force to the fork to deflect the second mounting flange to secure the motion control arm in the fork and thereby couple the motion control arm to the vehicle frame.

27. The method of claim 26 wherein applying the clamping force deflects the second member to move the second mounting flange toward the first mounting flange until the first mounting flange and the second mounting flange engage the motion control arm mounting structure.

28. The method of claim 27 wherein stress applied by deflecting the second member during mounting of the motion control arm end in the fork is prevented from being concentrated in an area of the second member where service loads are applied by configuring a portion of the second member other than the portion of the second member where service toads are applied to absorb the stress applied during mounting of the motion control arm end.

29. The bracket assembly of claim 28 wherein the stress applied by deflecting the second member during mounting of the motion control arm end in the fork is prevented from being concentrated in the second mounting flange by configuring a portion second member other than the second mounting flange to absorb the stress applied during mounting of the motion control arm end.

30. The method of claim 26 further comprising tightening one or more fasteners that connect the second member to the first member after inserting the motion control arm mounting structure in the fork.

31. The method of claim 30 wherein a first fastener that connects the second member to the first member is tightened before inserting the motion control arm mounting structure into the fork and a second fastener that connects the second member to the first member is tightened after inserting the motion control arm mounting structure into the fork.

32. The method of claim 31 wherein the first fastener is farther away from the second mounting flange than the second fastener.

33. The method of claim 26 wherein the first mounting flange is substantially undeflected by the clamping force.

34. The method of claim 26 wherein the second mounting flange extends away from the first mounting flange before the clamping force is applied and the second mounting flange is substantially parallel to the first mounting flange when the clamping force is applied.

* * * * *